(12) United States Patent
Gruber et al.

(10) Patent No.: US 12,528,793 B2
(45) Date of Patent: Jan. 20, 2026

(54) COMPOUNDS FOR TREATING TUBERCULOSIS

(71) Applicants: NANYANG TECHNOLOGICAL UNIVERSITY, Singapore (SG); AGENCY FOR SCIENCE, TECHNOLOGY AND RESEARCH, Singapore (SG)

(72) Inventors: Gerhard Gruber, Singapore (SG); Roderick Wayland Bates, Singapore (SG); Shuyi Pearly Ng, Singapore (SG)

(73) Assignees: NANYANG TECHNOLOGICAL UNIVERSITY, Singapore (SG); AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 910 days.

(21) Appl. No.: 17/780,235

(22) PCT Filed: Nov. 26, 2020

(86) PCT No.: PCT/SG2020/050695
§ 371 (c)(1),
(2) Date: May 26, 2022

(87) PCT Pub. No.: WO2021/107876
PCT Pub. Date: Jun. 3, 2021

(65) Prior Publication Data
US 2023/0348436 A1    Nov. 2, 2023

(30) Foreign Application Priority Data

Nov. 26, 2019    (SG) .......................... 102101911205R

(51) Int. Cl.
*C07D 403/12* (2006.01)
*A61K 31/4709* (2006.01)
*A61K 31/506* (2006.01)
*A61P 31/06* (2006.01)

(52) U.S. Cl.
CPC ........ *C07D 403/12* (2013.01); *A61K 31/4709* (2013.01); *A61K 31/506* (2013.01); *A61P 31/06* (2018.01)

(58) Field of Classification Search
CPC .............................. A61K 31/47; A61P 31/06
See application file for complete search history.

(56) References Cited

FOREIGN PATENT DOCUMENTS

| CA | 3056590 A1 | 8/2018 | |
|---|---|---|---|
| CN | 1976704 A | 6/2007 | |
| WO | WO-2017155909 A1 * | 9/2017 | ......... A61K 31/4709 |
| WO | WO-2018151681 A1 | 8/2018 | |

OTHER PUBLICATIONS 3,5-Dialkoxypyridine analogues of bedaquiline are potent antituberculosisagents with minimal inhibition of the hERG channel Sutherland et al. Bioorganic & Medicinal Chemistry 27 (2019) 1292-1307, Apr. 1, 2019 (Year: 2019).*
Hotra, A. et al., Discovery of a Novel Mycobacterial F-ATP Synthase Inhibitor and its Potency in Combination with Diarylquinolines. Angewandte Chemie, Apr. 26, 2020, vol. 132, No. 32, pp. 13397-13406 [Retrieved on Mar. 3, 2021] <DOI: 10.1002/ANGE.202002546> p. 13403 Table 1 compound 6-8, left col. line 6-right col. line 5, supporting information, p. S23, S25-S27.
Korbee, C. J. et al., Combined chemical genetics and data-driven bioinformatics approach identifies receptor tyrosine kinase inhibitors as host-directed antimicrobials. Nature Communications, Jan. 24, 2018, vol. 9, Article No. 358: 1-14 [Retrieved on Mar. 3, 2021] <DOI: 10.1038/S41467-017-02777-6> Whole document, in particular Table 2 first entry, p. 11, right col., line 5-14.
Pethe, K. et al., A chemical genetic screen in *Mycobacterium tuberculosis* identifies carbon-source-dependent growth inhibitors devoid of in vivo efficacy. Nature Communications, Aug. 24, 2010, vol. 1, Article No. 57: 1-8 [Retrieved on Mar. 3, 2021] <DOI: 10.1038/NCOMMS1060> Whole document, in particular p. 2 Table 1, compound 2.

(Continued)

*Primary Examiner* — Jeffrey S Lundgren
*Assistant Examiner* — Eric Tran
(74) *Attorney, Agent, or Firm* — Harness, Dickey & Pierce, P.L.C.

(57) ABSTRACT

The invention concerns a compound of formula (Ia) or (Ib) wherein $R_1$ is hydrogen or a methyl group; $R_2$ is an unsubstituted or substituted alkyl group; $R_3$ is an aryl group or a heteroaryl group, optionally substituted by one or more groups selected from halogen, alkyl or alkoxy; and, in Formula (Ia), X is CH or N and Y is NH, S or O, or, in Formula (Ib), X is NH, S or O and Y is CH or N. The invention further concerns a method of synthesizing the inventive compound, a composition comprising the inventive compound or a pharmaceutically acceptable salt thereof and bedaquiline (BDQ), an analogue of bedaquiline (BDQ) or a mixture thereof, and the use of said composition or compound for the treatment of tuberculosis.

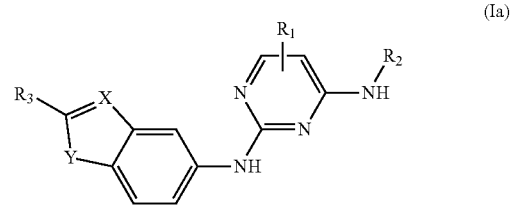

(Ia)

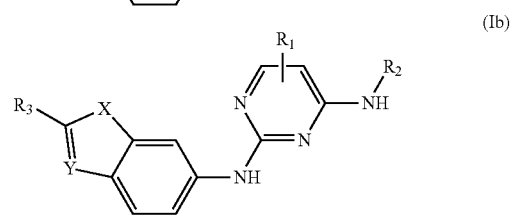

(Ib)

19 Claims, 3 Drawing Sheets

(56) References Cited

OTHER PUBLICATIONS

Saw, W.-G. et al., Disrupting coupling within mycobacterial F-ATP synthases subunit ɛ causes dysregulated energy production and cell wall biosynthesis. Scientific reports, Nov. 14, 2019, vol. 9, Article No. 16759: 1-15 [Retrieved on Mar. 3, 2021] <DOI: 10.1038/S41598-019-53107-3> Whole document.

Sutherland HS, Tong AST, Choi PJ, Conole D, Blaser A, Franzblau SG, Cooper CB, Upton AM, Lotlikar MU, Denny WA, Palmer BD. 2018. Structure-activity relationships for analogs of the tuberculosis drug bedaquiline with the naphthalene unit replaced by bicyclic heterocycles. Bioorg Med Chem 26:1797-1809.

Mordenti and Rescigno, (1992) Pharmaceutical Research. 9:17-25.

Mordenti and Chappell, "The use of interspecies scaling in toxicokinetics" in Toxicokinetics and New Drug Development, Yacobi et al. (eds) (Pergamon Press: NY, 1989), pp. 42-96.

A. Koul, L. Vranckx, N. Dhar, H. W. Gohlmann, E. Ozdemir, J. M. Neefs, M. Schulz, P. Lu, E. Mortz, J. D. Mckinney, K. Andries, D. Bald, Nat Commun 2014, 5, 3369.

Preiss L, Langer JD, Yildiz O, Eckhardt-Strelau L, Guillemont JEG, Koul A & Meier T (2015) Structure of the mycobacterial ATP synthase Fo rotor ring in complex with anti-TB drug bedaquiline. Sci. Adv. 1 :e1500106.

Tong AST, Choi PJ, Blaser A, Sutherland HS, Tsang SKY, Guillemont J, Motte M, Cooper CB, Andries K, Van den Broeck W, Franzblau SG, Upton AM, Denny WA, Palmer BD, Conole D. 2017. 6-Cyano Analogues of Bedaquiline as Less Lipophilic and Potentially Safer Diarylquinolines for Tuberculosis. ACS Med Chem Lett 8:1019-1024.

Choi PJ, Sutherland HS, Tong AST, Blaser A, Franzblau SG, Cooper CB, Lotlikar MU, Upton AM, Guillemont J, Motte M, Queguiner L, Andries K, Van den Broeck W, Denny WA, Palmer BD. 2017. Synthesis and evaluation of analogues of the tuberculosis drug bedaquiline containing heterocyclic B-ring units. Bioorg Med Chem Lett 27:5190-5196.

Sarathy, J., Ragunathan, P., Joon, S., Cooper, C., Upton, A., Gruber, G., and Dick, T. (2019) TBAJ-876 retains Bedaquiline's activity against subunit c and ɛ of *Mycobacterium tuberculosis* F-ATP synthase. Antimicrob. Agents Chemother. 63(10). pii: e01191-19.

International Search Report and Written Opinion of the International Search Authority, issued in PCT/SG2020/050695, mailed Mar. 3, 2021; ISA/SG.

Mordenti et al., (1991) Pharmaceutical Research. 8:1351-1359.

Canadian Patent Application No. 3163103 Office Action dated Jan. 18, 2024.

Chinese Patent Application No. 202080093938.6, Office Action dated Jun. 6, 2024—English Translation Available.

\* cited by examiner

COMPOUNDS FOR TREATING TUBERCULOSIS

CROSS-REFERENCE TO RELATED APPLICATIONS

This application is a 371 U.S. National Phase of International Application No. PCT/SG2020/050695, filed Nov. 26, 2020, which claims priority to Singapore Patent Application No. 10201911205R, filed Nov. 26, 2019. The entire disclosures of the above applications are incorporated herein by reference.

TECHNICAL FIELD OF THE INVENTION

The present invention relates to compounds and compositions for treating tuberculosis.

BACKGROUND OF THE INVENTION

The following discussion of the background of the invention is intended to facilitate the understanding of the present invention. However, it should be appreciated that the discussion is not an acknowledgement or admission that any of the material referred to was published, known or a part of the common general knowledge in any jurisdiction as at the priority date of the application.

Tuberculosis (TB) is an infectious disease caused by the bacterium *Mycobacterium tuberculosis*. New therapeutical strategies are needed to combat the tuberculosis pandemic and the spread of multi-drug-resistant (MDR) and extensively drug-resistant (XDR) forms of TB, which remain a serious public health challenge worldwide.

Bedaquiline (BDQ; Sirturo®) is an antitubercular compound that belongs to the chemical class of diarylquinolines. However, despite the clinical success of BDQ, clinical resistance to BDQ has been reported in extensively drug-resistant tuberculosis (XDR-TB) patients.

WO 201 8/1 51 681 A2 relates to specific pyrimidine compounds and compositions containing them for treating tuberculosis.

There exists a continuous need to develop further compounds or compositions for treating tuberculosis.

SUMMARY OF THE INVENTION

In one aspect of the present invention, there is provided a compound of formula (Ia) or (Ib)

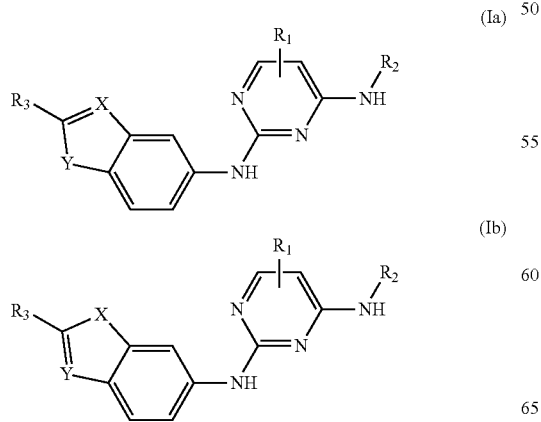

wherein
$R_1$ is hydrogen or a methyl group;
$R_2$ is an unsubstituted or substituted alkyl group;
$R_3$ is an aryl group or a heteroaryl group, optionally substituted by one or more groups selected from halogen, alkyl or alkoxy; and,
in Formula (Ia), X is CH or N and Y is NH, S or O, or,
in Formula (Ib), X is NH, S or O and Y is CH or N.

In a preferred embodiment of the invention, in Formula (Ia), X is N and Y is NH, or, in Formula (Ib), X is NH and Y is N.

More preferably, $R_1$ is a methyl group at the 6-position of the pyrimidine ring.

Preferably, $R_2$ is an ethyl group or a —$CH_2COOCH_2CH_3$ group.

In another preferred embodiment of the invention, $R_3$ is an aryl group.

Most preferably, the aryl group is substituted by one or more halogen atoms.

Specifically, the compound is selected from the group consisting of

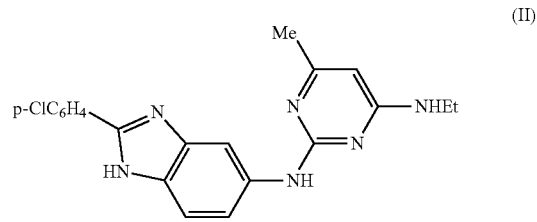

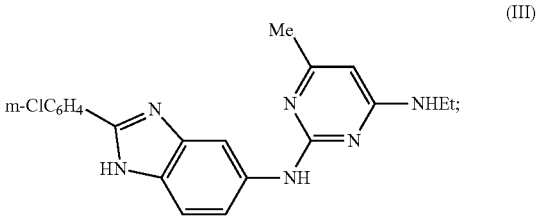

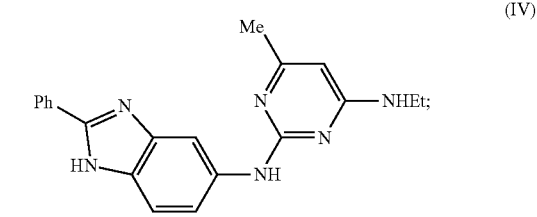

and tautomers thereof.

In another aspect, the invention is related to a composition comprising a compound according to the invention or a pharmaceutically acceptable salt thereof and bedaquiline (BDQ), an analogue of bedaquiline (BDQ) or a mixture thereof.

Preferably, the analogue of bedaquiline (BDQ) comprises a racemate of a compound of formula (V):

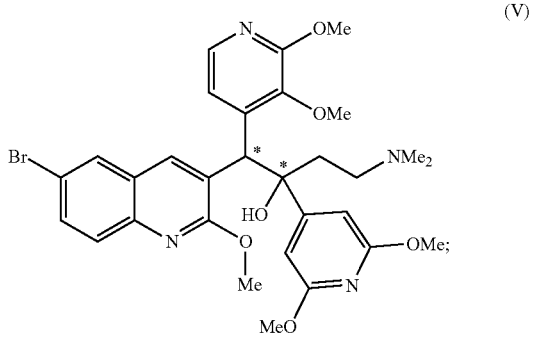 [SMILES: COc1cc(C(O)(CCN(C)C)C(c2cc3cc(Br)ccc3nc2OC)c2ccnc(OC)c2OC)cc(OC)n1]

(V)

or a racemate of a compound of formula (VI)

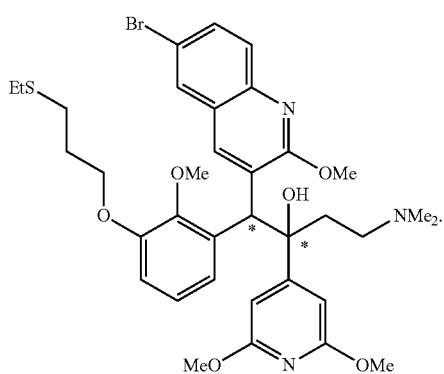

(VI)

In another aspect, the invention is related to a compound according to the invention for use in therapy.

In another aspect, the invention is related to a compound according to the invention for the treatment of a bacterial infection.

Preferably, the bacterial infection is tuberculosis, in particular multi-drug-resistant or extensively drug-resistant tuberculosis.

In another aspect, the invention is related to the use of a compound according to the invention in the manufacture of a medicament for the treatment of a bacterial infection.

Preferably, the bacterial infection is tuberculosis, in particular multi-drug-resistant or extensively drug-resistant tuberculosis.

In another aspect, the invention is related to a composition according to the invention for use in therapy.

In another aspect, the invention is related to a composition according to the invention for the treatment of a bacterial infection.

Preferably, the bacterial infection is tuberculosis, in particular multi-drug-resistant or extensively drug-resistant tuberculosis.

In another aspect, the invention is related to the use of a composition according to the invention in the manufacture of a medicament for the treatment of a bacterial infection.

Preferably, the bacterial infection is tuberculosis, in particular multi-drug-resistant or extensively drug-resistant tuberculosis.

In another aspect, the invention is related to a method of treating a subject suffering from a bacterial infection comprising the steps of administering to the subject a therapeutically effective amount of a compound or a composition according to the invention.

Preferably, the bacterial infection is tuberculosis, in particular multi-drug-resistant or extensively drug-resistant tuberculosis.

In another aspect, the invention is related to a method of synthesizing a compound according to the invention, wherein X is NH and Y is N, or vice versa, the method comprising the following steps:
(a) reacting 4-nitrobenzene-1,2-diamine with benzoic acid, unsubstituted or substituted with $R_3$, in the presence of an acid;
(b) reducing the nitro group to obtain the respective amine derivative; and
(c) reacting the amine derivative of step (b) with 2-chloropyrimidine-4-amine, substituted with $R_1$ and $R_2$.

DETAILED DESCRIPTION

Figure 1:
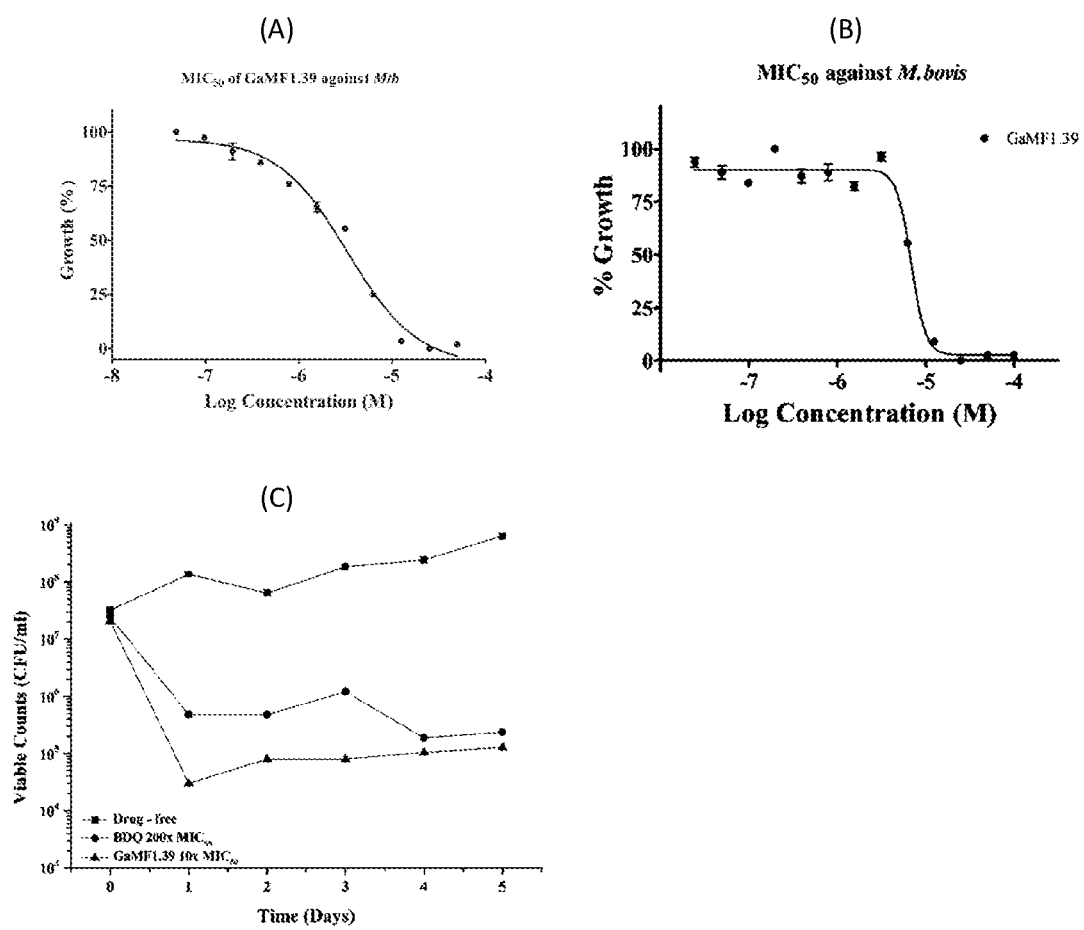
FIG. 1: (A) Growth inhibition of Mtb H37Rv by the compound of Formula (II) (designated as GaMF1.39). (B) Growth inhibition of M. bovis bacillus Calmette-Guérin (BCG) cells by the compound of Formula (II) (designated as GaMF1.39). (C) Kill kinetics of BDQ and the compound of Formula (II) against M. smegmatis $mc^2$ 155. The bacteria were grown in liquid culture (LBT) in the presence of 10×$MIC_{50}$ of the compound of Formula (II) and 200×$MIC_{50}$ of BDQ. Samples of bacterial culture were taken at different time points (from t=0 days up to t=4 days) and plated on Middlebrook 7H11 agar plates. The plates were incubated at 37° C. for 3 days until colonies appeared.

Particular embodiments of the present invention will now be described with reference to the accompanying drawings. The terminology used herein is for the purpose of describing particular embodiments only and is not intended to limit the scope of the present invention. Additionally, unless defined otherwise, all technical and scientific terms used herein have the same meanings as commonly understood by one of ordinary skill in the art to which the present invention belongs.

Throughout the specification, unless otherwise indicated to the contrary, the terms "comprising", "consisting of", and the like, are to be construed as non-exhaustive, or in other words, as meaning "including, but not limited to".

Throughout the specification, unless the context requires otherwise, the word "comprise" or variations such as "comprises" or "comprising", will be understood to imply the inclusion of a stated feature or group of features but not the exclusion of any other feature or group of features.

Throughout the specification, unless the context requires otherwise, the word "include" or variations such as "includes" or "including", will be understood to imply the inclusion of a stated feature or group of features but not the exclusion of any other feature or group of features.

As used herein, the term "about" typically means +/− 5% of the stated value, more typically +/− 4% of the stated value, more typically +/− 3% of the stated value, more typically +/− 2% of the stated value, even more typically +/− 1% of the stated value, and even more typically +/− 0.5% of the stated value.

As used herein, the term "pharmaceutically acceptable salt" refers to a salt prepared from a pharmaceutically acceptable non-toxic base or acid.

As used herein, the terms "treatment", "treat" and "therapy", and synonyms thereof refer to both therapeutic treatment and prophylactic or preventative measures, wherein the object is to prevent or slow down (lessen) TB. Those in need of such treatment include those already suffering from a TB infection as well as those prone to getting it or those in whom a TB infection is to be prevented.

As used herein, the term "therapeutically effective amount" of a compound will be an amount of active agent that is capable of preventing or at least slowing down (lessening) TB. Dosages and administration of compounds, compositions and formulations of the present invention may be determined by one of ordinary skill in the art of clinical pharmacology or pharmacokinetics. See, for example, Mordenti and Rescigno, (1992) Pharmaceutical Research. 9:17-25; Morenti et al., (1991) Pharmaceutical Research. 8:1351-1359; and Mordenti and Chappell, "The use of interspecies scaling in toxicokinetics" in Toxicokinetics and New Drug Development, Yacobi et al. (eds) (Pergamon Press: NY, 1989), pp. 42-96. An effective amount of the compounds, compositions and formulations of the present invention to be employed therapeutically will depend, for example, upon the therapeutic objectives, the route of administration, and the condition of the patient. As used in the specification herein, the term "patient" includes humans and animals. Accordingly, it will be necessary for the therapist to titer the dosage and modify the route of administration as required to obtain the optimal therapeutic effect. A typical daily dosage might range from about 1 µg/kg/day to about 50 mg/kg/day of the patient's body weight or more per day, about 1 mg/kg/day to about 50 mg/kg/day, about 1 mg/kg/day to about 10 mg/kg/day, preferably about 1 µg/kg/day to about 10 mg/kg/day.

As used herein, the term "alkyl" is meant to be a branched or unbranched saturated hydrocarbon group of 1 to 10 carbon atoms, such as methyl, ethyl, n-propyl, isopropyl, n-butyl, isobutyl, sec-butyl, tert-butyl, n-pentyl, isopentyl, sec-pentyl, neopentyl, hexyl, heptyl, octyl, nonyl, decyl. The alkyl group can be cyclic or acyclic. The alkyl group can also be substituted or unsubstituted. For example, the alkyl group can be substituted with one or more groups including, but not limited to, optionally substituted alkyl, cycloalkyl, alkoxy, amino, ether, halogen, hydroxy, nitro, silyl, sulfo-oxo, or thiol, as described herein. In a preferred embodiment, the term "alkyl" is meant to be a branched or unbranched alkyl group containing from 1 to 6 carbon atoms. In an even more preferred embodiment, the term "alkyl" is meant to be a branched or unbranched alkyl group of 1 to 4 carbon atoms.

Throughout the specification, "alkyl" is generally used to refer to both unsubstituted alkyl groups and substituted alkyl groups; if appropriate, substituted alkyl groups are also specifically referred to herein by identifying the specific substituent(s) on the alkyl group. For example, the term "halogenated alkyl" specifically refers to an alkyl group that is substituted with one or more halogen atoms, e.g., fluorine, chlorine, bromine, or iodine. The term "alkoxyalkyl" specifically refers to an alkyl group that is substituted with one or more alkoxy groups. The term "alkylamino" specifically refers to an alkyl group that is substituted with one or more amino groups. The term "azaalkyl" specifically refers to an alkyl group wherein at least one carbon is replaced by a nitrogen. The term "oxaalkyl" specifically refers to an alkyl group wherein at least one carbon is replaced by an oxygen.

As used herein, the terms "alkoxy" and "alkoxyl" refer to an alkyl or cycloalkyl group bonded through an ether linkage; that is, an "alkoxy" group can be defined as —OA1 where A1 is alkyl or cycloalkyl as defined above. "Alkoxy" also includes oligomers of alkoxy groups as just described; that is, an alkoxy can be a polyether such as —OA1-OA2 or —OA1-(OA2)$_a$-OA3, where "a" is an integer of from 1 to 200 and A1, A2, and A3 are alkyl and/or cycloalkyl groups.

As used herein, the term "derivative" or "analog" refers to a compound that has a similar or related structure as a compound that the term is used in reference to.

As used herein, a bond of a substituent on a ring structure not directed to a specific position thereof but to the centre of the ring structure means that the substituent can be bound to any possible position of that ring structure. As an example, $R_1$ of Formula (Ia) or Formula (Ib) can be bound to any of the possible positions on the pyrimidine ring, i.e. to either the 5- or 6-position thereof.

Throughout this disclosure, certain embodiments may be disclosed in a range format. It should be understood that the description in range format is merely for convenience and brevity and should not be construed as a limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. Ranges are not limited to integers, and can include decimal measurements. This applies regardless of the breadth of the range.

Other aspects of the invention will become apparent to those of ordinary skill in the art upon review of the following description of specific embodiments of the invention in conjunction with the accompanying figures.

In one aspect of the present invention, there is provided a compound of formula (Ia) or (Ib)

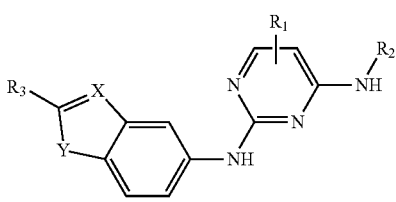

(Ia)

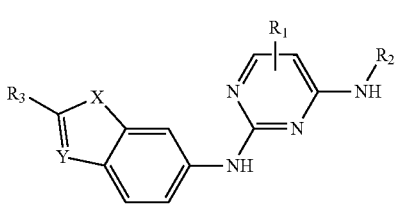

(Ib)

wherein
- R$_1$ is hydrogen or a methyl group;
- R$_2$ is an unsubstituted or substituted alkyl group;
- R$_3$ is an aryl group or a heteroaryl group, optionally substituted by one or more groups selected from halogen, alkyl or alkoxy; and,
- in Formula (Ia), X is CH or N and Y is NH, S or O, or, in Formula (Ib), X is NH, S or O and Y is CH or N.

Advantageously, the compounds of the present invention target the F-ATP synthase. The FiFo ATP synthase (F-ATP synthase) is one of the essential enzymes in supplying the energy requirement of both the proliferating aerobic and hypoxic dormant stage of the life cycle of mycobacteria. The enzyme is composed of nine subunits in the stoichiometry of α3:β3:γ:δ:ε:a:b:b':c9, and organized in a membrane-embedded F$_O$ domain (a:b:b':c9) and a water soluble F$_1$ part (α3:β3:γ:δ:ε). The F$_1$ domain contains three catalytic αβ-pairs that form an α3:β3 hexamer, in which ATP synthesis or ATP hydrolysis takes place. This catalytic α3:β3-headpiece is linked via the two central stalk subunits γ, ε and the peripheral stalk with the ion-pumping F$_O$ part. The F$_O$ domain contains subunit a, b and b' as well as a ring structure consisting of 9 c subunits. The rotational movement of the c-ring is proposed to trigger the central subunits γ and ε to rotate, causing sequential conformational changes in the nucleotide-binding subunits α and β, followed by the synthesis of ADP+Pi to ATP.

The F-ATP synthase has been shown to be essential for optimal growth in *Mycobacterium smegmatis* and *Mycobacterium tuberculosis* (Mtb), with the latter causing TB. This is different in other prokaryotes and eukaryotes (i.e. humans), where the enzyme is dispensable for growth on fermentable carbon sources and where increased glycolytic flux can compensate for the loss of oxidative phosphorylation. The difference was attributed to be due to an extraordinarily high 25 amount of ATP required to synthesize a mycobacterial cell. The uniqueness of the mycobacterial F-ATP synthase lies also in its incapability of proton-translocation, and its low or latent ATPase activity of the fast- or slow-growing form, respectively.

The clinical success of BDQ, an inhibitor of the F$_1$F$_0$ ATP synthase, validated this enzyme complex as a vulnerable target for anti-tuberculosis drug development.

Furthermore, F-ATP synthase belongs to the orchestra of enzymes forming the electron transport chain (ETC), to which the cytochrome c oxidase (cyt-bc1-aa3) and a bacterial specific cytochrome bd-type menaquinol oxidase (cyt-bd) belong to, and the F-ATP synthase contributes to the generation of ATP.

More advantageously, the compounds of the present invention target the soluble F$_1$ part of the mycobacterial F$_1$F$_0$-ATP synthase in drug resistant MDR and XDR-TB. The concept is anchored in novel insights by the inventors into nature's paradigms for securing energy inside mycobacteria, new drug targets inside the key catalyst responsible for ATP synthesis and development of new compounds. In addition, the compounds of the present invention were found to contribute to a synergistic efficacy with new BDQ analogues in a multi-drug combination, thereby addressing the challenges of MDR and XDR-TB.

The compounds of the present invention are benzamide analogues of the compounds described in WO 2018/151681A2, which have not been described before.

In various embodiments, in Formula (Ia), X is N and Y is NH, or, in Formula (Ib), X is NH and Y is N.

In various embodiments, R$_1$ is a methyl group at the 6-position of the pyrimidine ring.

In various embodiments, R$_2$ is an ethyl group or a —CH$_2$COOCH$_2$CH$_3$ group.

In various embodiments, R$_3$ is an aryl group.

In various embodiments, the aryl group is substituted by one or more halogen atoms.

In various specific embodiments, the compound is selected from the group consisting of

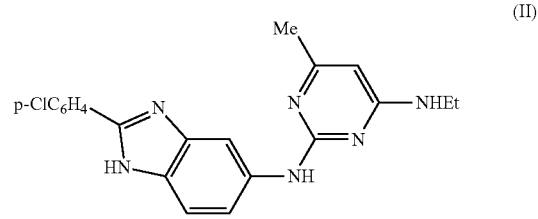

(II)

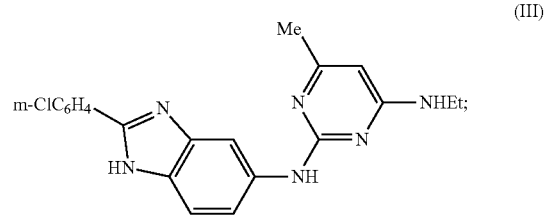

(III)

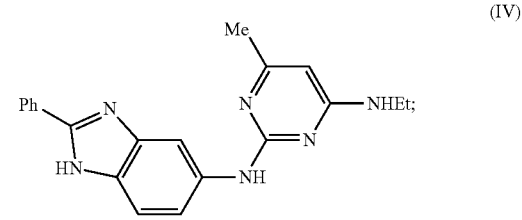

(IV)

and tautomers thereof.

The test results for the compounds (II), (III) and (IV) are shown in Table 1.

TABLE 1

Test results for benzamide analogue compounds

| Compound of Formula | Structure | $IC_{50}$ for ATP synthesis inhibition (M. smeg., μM) | M. smeg., $MIC_{50}$, (μM) | Mtb, $MIC_{50}$, [μM] |
|---|---|---|---|---|
| (II) | p-ClC₆H₄-benzimidazole-NH-pyrimidine(Me)(NHEt) | 0.09 | 9.9 | 3 |
| (III) | m-ClC₆H₄-benzimidazole-NH-pyrimidine(Me)(NHEt) | 0.29 | 14.6 | 5.2 |
| (IV) | Ph-benzimidazole-NH-pyrimidine(Me)(NHEt) | 0.28 | 23.5 | 8.8 |

Very surprisingly, all of these analogues display good $IC_{50}$ and $MIC_{50}$ values with one of those compounds (compound of Formula (II)) being strikingly superior even to the main compound of WO 2018/151681 A2 (designated there as "cpd6").

The compound of Formula (II) exhibited a 10-fold improvement regarding the minimal inhibitory concentration ($MIC_{50}$) of 3 μM in Mtb H37Rv (see Table 1 above; FIG. 1A) and 6.8 μM in M. bovis bacillus Calmette-Guérin (BCG) (FIG. 1B). The compound of Formula (II) was bactericidal against M. smegmatis mc² 155 at 20-fold its $MIC_{50}$, indicated by the observed inhibited cell growth as shown in FIG. 1C. In contrast, BDQ had delayed bactericidal activity, as reported before (A. Koul, L. Vranckx, N. Dhar, H. W. Gohlmann, E. Ozdemir, J. M. Neefs, M. Schulz, P. Lu, E. Mortz, J. D. McKinney, K. Andries, D. Bald, Nat Commun 2014, 5, 3369.).

Figure 2:
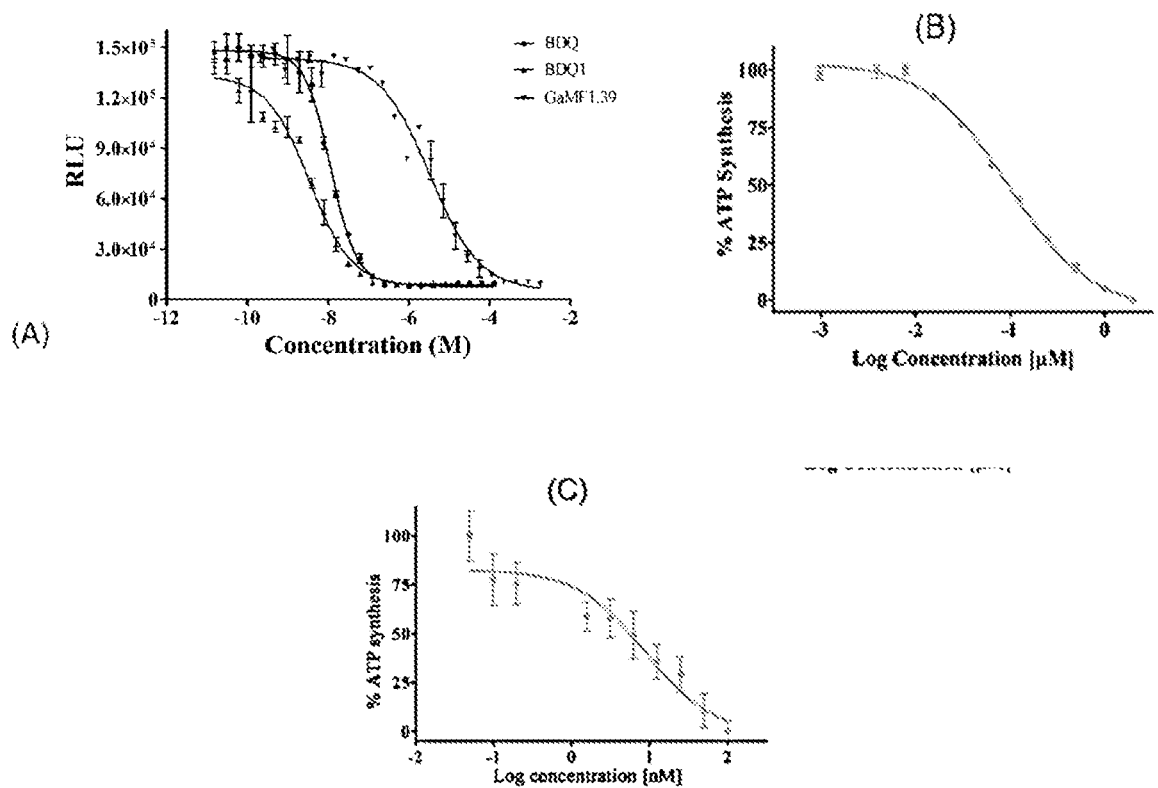
FIG. 2: (A) Inhibition of Intracellular ATP synthesis of M. bovis BCG cells by the compound of Formula (II) (designated as GaMF1.39) in comparison to BDQ and compound of Formula (VI) (designated as BDQ1). Inhibition of ATP synthesis by the compound of Formula (II) in inside-out membrane vesicles (IMVs) from M. smegmatis with an $IC_{50}$ of 90 nM on M. smegmatis (B) and 8.7 nM on M. bovis BCG IMVs (C).

To determine if the anti-mycobacterial activity is due to oxidative phosphorylation inhibition, an intracellular ATP synthesis assay was carried out on M. bovis BCG (FIG. 2A). The compound of Formula (II) had an effect on ATP levels at an $IC_{50}$ of 3.3 μM, indicating its ability to inhibit ATP synthesis within the cell and the compound of Formula (VI) (designated as BDQ-1) revealed an $IC_{50}$ of 3.4 nM for intracellular ATP synthesis inhibition, slightly improved when compared to BDQ ($IC_{50}$=11.5 nM; FIG. 2A). The $IC_{50}$ BDQ as a control was found to be 11.5 nM, which is similar to reported $IC_{50}$ values (Preiss L, Langer J D, Yildiz Ö, Eckhardt-Strelau L, Guillemont JEG, Koul A & Meier T (2015) Structure of the mycobacterial ATP synthase $F_O$ rotor ring in complex with anti-TB drug bedaquiline. Sci. Adv. 1:e1500106.). Interestingly, the compound of Formula (II) afforded an 18-fold enhancement in ATP synthesis inhibition of about 90 nM on M. smegmatis (FIG. 2B) and even 8.7 nM on M. bovis BCG IMVs (FIG. 2C).

The compound of Formula (II), with a clogP value of 6.51, is less lipophilic than BDQ (clogP=7.25), and has a good metabolic stability in mouse liver microsomes ($T_{1/2}$ of 29.6 min, $CL_{hep}$ of 60.5 ml/min/kg, and $CI_{int}$ of 46.8 ml/min/mg protein).

To explore anti-TB potency of the compound of Formula (II), THP1 cells (monocytes) have been infected by M. bovis BCG, which has a similar genome to M. tuberculosis.

In a second aspect, the invention is related to a composition comprising a compound according to the invention or a pharmaceutically acceptable salt thereof and bedaquiline (BDQ), an analogue of bedaquiline (BDQ) or a mixture thereof.

In various embodiments, the bedaquiline (BDQ) comprises a compound of formula (VII):

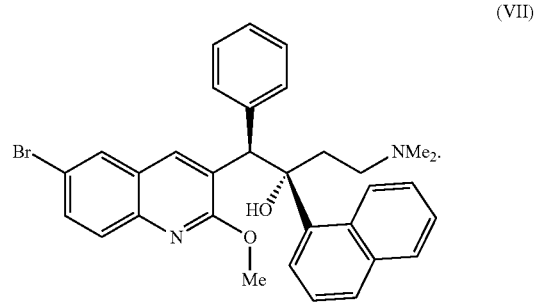 [SMILES: COc1nc2ccc(Br)cc2cc1[C@@H](c1ccccc1)[C@@](O)(CCN(C)C)c1cccc2ccccc12]

(VII)

Figure 5:
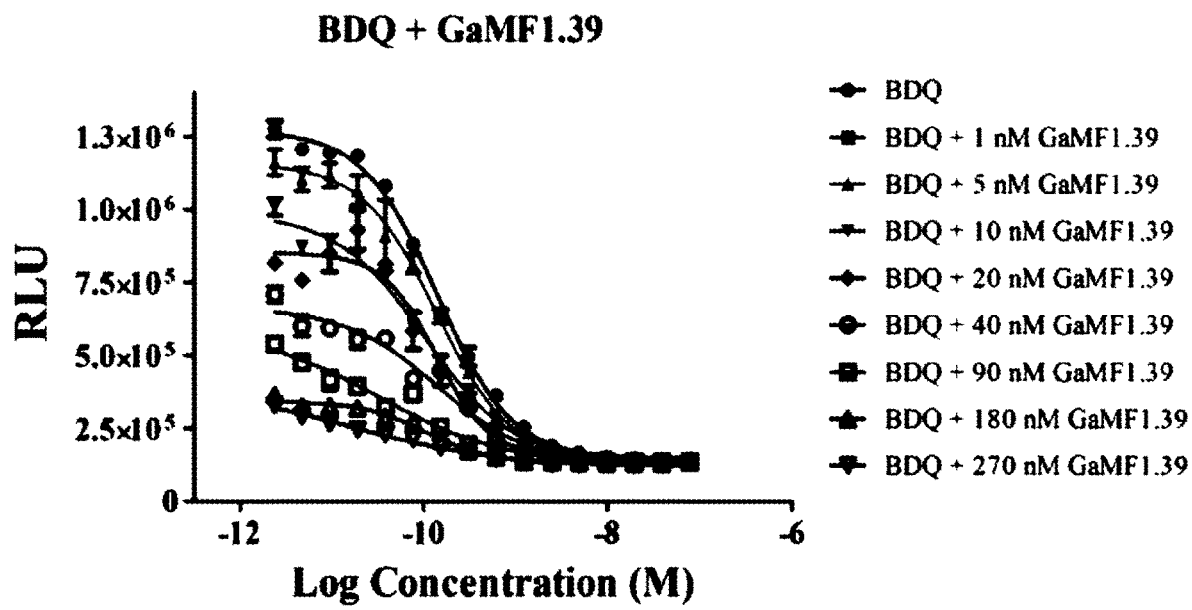
FIG. 5: Synergistic effect of the compound of Formula (II) (designated as GaMF1.39) and compound of Formula (VII) (designated as BDQ) on the ATP synthesis inhibition in IMVs of M. smegmatis. When the compound of Formula (II) was added in a concentration dependent manner to the racemate of the compound of Formula (VII) (300 nM), ATP synthesis significantly decreased to almost full inhibition.

The synergistic effect of the racemate of the compound of Formula (VII) (BDQ) with different concentrations of the compound of Formula (II) were tested on *M. smegmatis* IMVs. As shown in FIG. 5, addition of 3×IC$_{50}$ (270 nM) of the compound of Formula (II) completely inhibited the ATP synthesis.

In various embodiments, the analogue of bedaquiline (BDQ) comprises a racemate of a compound of formula (V):

(V)

[Chemical structure of Formula (V): A brominated quinoline with methoxy groups, connected to chiral carbons bearing OH, NMe$_2$, and pyridine-OMe substituents]

or
a racemate of a compound of Formula (VI):

(VI)

[Chemical structure of Formula (VI): A brominated quinoline with EtS and OMe substituents, connected to chiral carbons bearing OH, NMe$_2$, and pyridine-OMe substituents]

wherein the asterisks in Formulas (V) and (VI) designate chiral carbon atoms.

Most recently, BDQ analogues with improved potency in *M. tuberculosis* strains as well as pharmacological properties have been described (Tong AST, Choi P J, Blaser A, Sutherland H S, Tsang S K Y, Guillemont J, Motte M, Cooper C B, Andries K, Van den Broeck W, Franzblau S G, Upton A M, Denny W A, Palmer B D, Conole D. 2017. 6-Cyano Analogues of Bedaquiline as Less Lipophilic and Potentially Safer Diarylquinolines for Tuberculosis. ACS Med Chem Lett 8:1019-1024; Choi P J, Sutherland H S, Tong A S T, Blaser A, Franzblau S G, Cooper C B, Lotlikar M U, Upton A M, Guillemont J, Motte M, Queguiner L, Andries K, Van den Broeck W, Denny W A, Palmer B D. 2017. Synthesis and evaluation of analogues of the tuberculosis drug bedaquiline containing heterocyclic B-ring units. Bioorg Med Chem Lett 27:5190-5196; Sutherland H S, Tong A S T, Choi P J, Conole D, Blaser A, Franzblau S G, Cooper C B, Upton A M, Lotlikar M U, Denny W A, Palmer B D. 2018. Structure-activity relationships for analogs of the tuberculosis drug bedaquiline with the naphthalene unit replaced by bicyclic heterocycles. Bioorg Med Chem 26:1797-1809; Sarathy, J., Ragunathan, P., Joon, S., Cooper, C., Upton, A., Grüber, G., and Dick, T. (2019) TBAJ-876 retains Bedaquiline's activity against subunit c and ε of Mycobacterium tuberculosis F-ATP synthase. Antimicrob. Agents Chemother. 63(10). pii: e01191-19), including the racemate of the compound of Formula (V), which appears to interact with the subunit c-ring and subunit ε of the mycobacterial F-ATP synthase. Using a modified synthesis protocol, the racemate of the compound of Formula (V) was synthesized (example section below).

Figure 3:
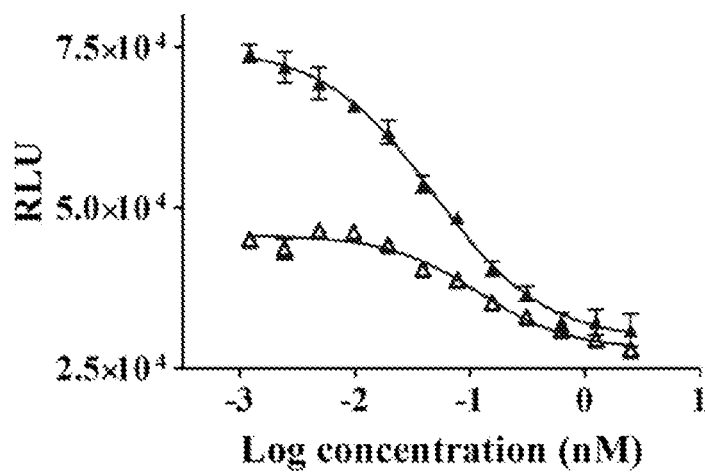
FIG. 3: 300 nM of the compound of Formula (II) (designated as GaMF1.39) increases the potency of the racemate of the compound of Formula (V) in ATP synthesis inhibition (Δ) when compared to the inhibitory effect of such racemate alone (▲).

FIG. 3 shows that 300 nM of the compound of Formula (II) increases the potency of the racemate of the compound of Formula (V) in ATP synthesis inhibition (Δ) of *M. smegmatis* IMVs when compared to the inhibitory effect of such racemate alone (▲).

Figure 4:
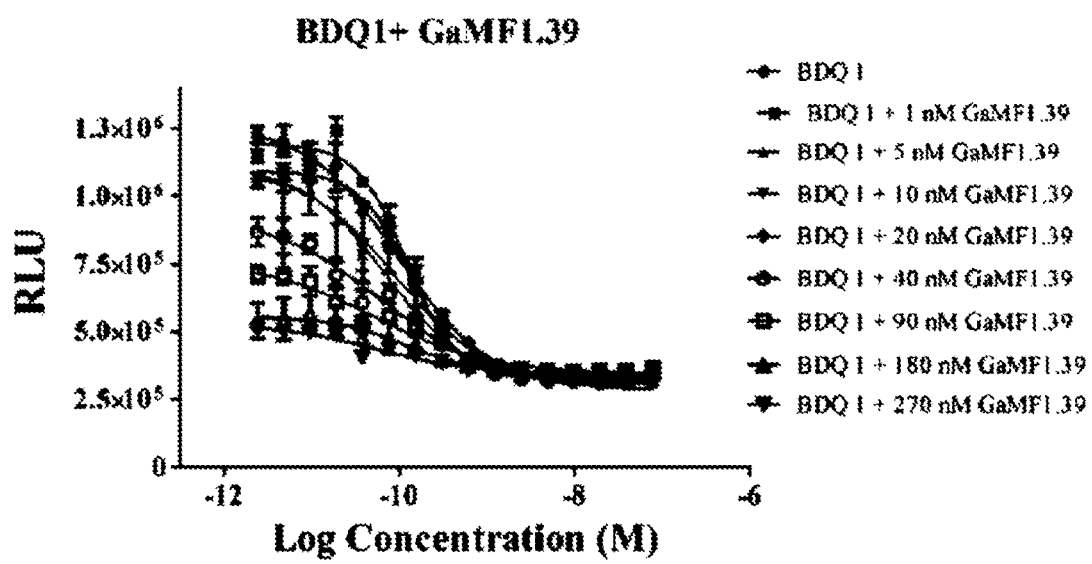
FIG. 4: Synergistic effect of the compound of Formula (II) (designated as GaMF1.39) and the racemate of the compound of Formula (VI) (designated as BDQ1) on the ATP synthesis inhibition in IMVs of M. smegmatis. When the compound of Formula (II) was added in a concentration dependent manner to the racemate of the compound of Formula (VI) (300 nM), ATP synthesis significantly decreased to almost full inhibition.

The synergistic effect of the racemate of the compound of Formula (VI) (designated as BDQ1) with different concentrations of the compound of Formula (II) were tested on *M. smegmatis* IMVs. As shown in FIG. 4, addition of 3×IC$_{50}$ (270 nM) of the compound of Formula (II) completely inhibited the ATP synthesis.

Further, a human embryonic stem cell (hESC) line (E3) was used to examine both potential drug-induced genotoxicity and perturbations of the hESC transcriptional program that lead to hESC differentiation. The assays revealed that the tested racemate of the compound of Formula (VI) (100 nM) in combination with 300 nM of the compound of Formula (II) did not show substantial genotoxic effects nor induced major alterations in the global transcriptional program.

In another aspect, the invention is related to a compound according to the invention for use in therapy.

In another aspect, the invention is related to a compound according to the invention for the treatment of a bacterial infection, preferably for the treatment of tuberculosis, in particular for the treatment of multi-drug-resistant or extensively drug-resistant tuberculosis.

In another aspect, the invention is related to the use of a compound according to the invention in the manufacture of a medicament for the treatment of a bacterial infection.

Preferably, the bacterial infection is tuberculosis, in particular multi-drug-resistant or extensively drug-resistant tuberculosis.

In another aspect, the invention is related to a composition according to the invention for use in therapy.

In another aspect, the invention is related to a composition according to the invention for the treatment of a bacterial infection, preferably for
  the treatment of tuberculosis, in particular for the treatment of multi-drug-resistant or extensively drug-resistant tuberculosis.

In another aspect, the invention is related to the use of a composition according to the invention in the manufacture of a medicament for the treatment of a bacterial infection.

Preferably, the bacterial infection is tuberculosis, in particular multi-drug-resistant or extensively drug-resistant tuberculosis.

In another aspect, the invention is related to a method of treating a subject suffering from a bacterial infection comprising the steps of administering to the subject a therapeutically effective amount of a compound or a composition according to the invention.

Preferably, the bacterial infection is tuberculosis, in particular multi-drug-resistant or extensively drug-resistant tuberculosis.

In another aspect, the invention is related to a method of synthesizing a compound according to the invention, wherein X is NH and Y is N, or vice versa, the method comprising the following steps:
(a) reacting 4-nitrobenzene-1,2-diamine with benzoic acid, unsubstituted or substituted with $R_3$, in the presence of an acid;
(b) reducing the nitro group to obtain the respective amine derivative; and
(c) reacting the amine derivative of step (b) with 2-chloropyrimidine-4-amine, substituted with $R_1$ and $R_2$.

EXAMPLES

Materials and Methods
Preparation of Inverted Membrane Vesicles from *M. smegmatis*

*M. smegmatis* was selected as the surrogate model for *M. tuberculosis*, because there are several advantages to work with it. *M. smegmatis* is a saprophytic and unlike *M. tuberculosis*, it is not pathogenic and can be safely handled under Biosafety level 2 (BSL2) conditions without Biosafety level 3 (BSL3) requirement. In addition, *M. smegmatis* grows much faster (generation time: approximately 3 hours) compared to that of *M. tuberculosis* (generation time: approximately 24 hours). Furthermore, it requires almost 3 to 4 weeks for *M. tuberculosis* to produce colonies on an agar plate, whereas only 2 to 3 days is required for *M. smegmatis* to produce colonies on an agar plate, thereby reducing the duration of experiments. Importantly, *M. smegmatis* inverted membrane vesicles (IMVs) show a detectable ATP hydrolysis activity, which is essential for enzymatic assays to be used or performed.

In order to purify IMVs of *M. smegmatis* for ATP synthesis and hydrolysis assays, cells were grown overnight at 37° C. in 7H9 supplemented with 10% ADC, 0.5% glycerol and 0.05% Tween80 until they reached an OD600 value of 0.4. The culture was expanded in 200 ml supplemented 7H9 and grown in a roller bottle (2 rpm) until $OD_{600}$=0.4. This culture was used to inoculate a 5 l culture that was grown overnight in roller bottles until an OD600=0.4. About 5 g (wet weight) of *M. smegmatis* were resuspended in 20 ml membrane preparation buffer (50 mM MOPS, 2 mM $MgCl_2$ pH 7.5) containing EDTA-free protease inhibitor cocktail (1 tablet in 20 ml buffer, Roche-USA) and 1.2 mg/ml lysozyme. The suspension was stirred at room temperature for 45 min and additionally supplemented with 300 µl 1 M $MgCl_2$ and 50 µl DNase I (Thermo Fischer, USA), and continued stirring for another 15 min at room temperature. All subsequent steps were performed on ice. Cells were broken by three passages through an ice precooled Model M-110L Microfluidizer processor (M-110L) at 18,000 psi. The suspension containing lysed cells was centrifuged at 4,200×g at 4° C. for 20 min. The supernatant containing membrane fraction was further subjected to ultracentrifugation 45,000×g at 4° C. for 1 h. The supernatant was discarded and the precipitated membrane fraction was resuspended in membrane preparation buffer containing 15% glycerol, aliquoted, snap frozen and stored at −80° C. The concentrations of the proteins in the vesicles were determined by the BCA method. Inverted membrane vesicles were stored at −80° C.

ATP Synthesis Assay

ATP synthesis was measured in flat bottom white microtiter 96 well plates (Corning USA). The reaction mix, made in assay buffer (50 mM MOPS, pH 7.5, mM $MgCl_2$) containing 10 µM ADP, 250 µM Pi and 1 mM NADH. Concentration of Pi was adjusted by addition of 100 mM KH2PO4 salt dissolved in the assay buffer. ATP synthesis was started by adding inverted vesicles of *M. smegmatis* to a final protein concentration of 5 µg/ml. The reaction mix was incubated at room temperature for 30 min before 50 µl of the CellTiter-glow reagent was added and the mix was incubated for another 10 min in dark at room temperature. Produced luminescence, which is correlated to the synthesized ATP, was measured by a Tecan plate reader Infinite 200 Pro (Tecan USA), using the following parameter: luminescence, integration time 500 ms, attenuation none.

Antimycobacterial Activity

The test compounds and the control drugs were screened against *M. smegmatis* mc2 155, M. tuberculosis H37Rv and *M. bovis* BCG. Initial stock solutions of the test compounds were made in 90% DMSO to a concentration of 10 mM. Ciprofloxacin was used as a positive control and the vehicle DMSO was used as negative control. In the first approach, the compounds were tested on microbial cultures at a fixed concentration of 50 µM. Each of the above strains were cultured at 37° C. in Middlebrook 7H9 broth supplemented with 0.2% glycerol and 10% ADC (Albumin Dextrose Catalase) until logarithmic growth was achieved ($OD_{600}$ 0.4-0.6). The test inoculum was obtained by diluting the suspensions to $OD_{600}$ 0.1 to a final volume of 1 ml in the test tubes and were incubated at 37° C. for for 24 hours (*M. smegmatis*) and for 7 days (Mtb). Test compounds which showed no visible growth of bacilli in comparison with the positive and negative controls were selected as hits.

General Procedure for the Synthesis of the Compound of Formula (Ia) or (Ib)

The compounds of Formula (Ia) or (Ib) were obtained according to the scheme below (Scheme S1) by heating the respective aryl or heteroaryl acid such as, for example, an unsubstituted or substituted benzoic acid, with 4-nitrobenzene-1,2-diamine in the presence of polyphosphoric acid. Nitro group reduction using Fe powder in the presence of ammonium chloride provided the benzimidazole amine derivatives which were reacted with a corresponding substituted 2-chloropyrimidine-4-amine (designated in scheme as S2) under microwave heating to give the final products.

Scheme S1. Synthesis of the compounds of formulae (II), (III) and (IV)

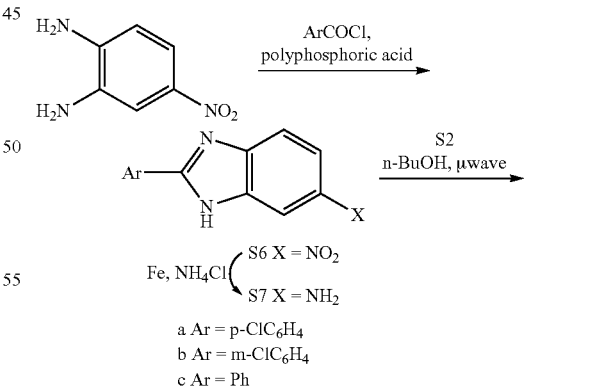

a Ar = p-ClC6H4
b Ar = m-ClC6H4
c Ar = Ph

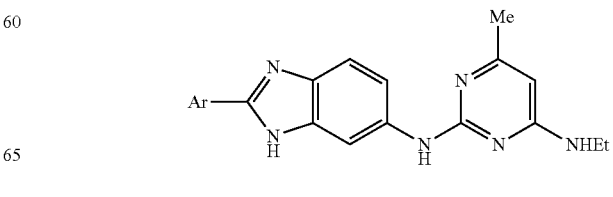

2(4-Chlorophenyl)-5-nitro-1H-benzo[d]imidazole S6a

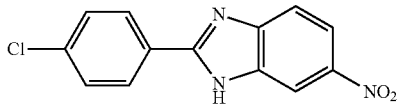 [SMILES: O=[N+]([O-])c1ccc2nc(-c3ccc(Cl)cc3)[nH]c2c1]

A mixture of 4-chlorobenzoic acid (292 mg, 1.87 mmol) and 4-nitrobenzene-1,2-diamine (300 mg, 1.96 mmol, 1.05 eq) in polyphosphoric acid (4 mL) was stirred at 140° C. for 4 hours. The reaction was quenched by pouring into water (5 mL) and adjusted to pH 7 with 10 N NaOH solution. The precipitate was filtered and dried in vacuo to give a black residue. The crude product was purified by silica gel flash chromatography (0-40% EtOAc/Hexanes) to afford compound S6a as a light green solid (142 mg, 28% yield); 1H NMR (400 MHz, DMSO-d6) δ 13.7 (br. s, 1H), 8.49 (s, 1H), 8.23 (d, J=6.8 Hz, 2H), 8.14 (dd, J=8.8, 2.4 Hz, 1H), 7.78 (d, J=8.4 Hz, 1H), 7.69 (d, J=8.4 Hz, 2H); MS (ESI) m/z 274.0 $[C_{13}H_8ClN_3O_2+H]^+$.

2-(3-Chlorophenyl)-5-nitro-1H-benzo[d]imidazole S6b

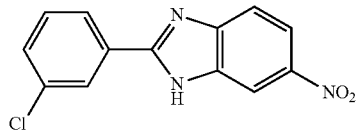 [SMILES: O=[N+]([O-])c1ccc2nc(-c3cccc(Cl)c3)[nH]c2c1]

A mixture of 3-chlorobenzoic acid (292 mg, 1.87 mmol) and 4-nitrobenzene-1,2-diamine (300 mg, 1.96 mmol, 1.05 eq) in polyphosphoric acid (4 mL) was stirred at 140° C. for 2 hours. The reaction was quenched by pouring into water (5 mL) and adjusted to pH 7 with 10 N NaOH solution. The precipitate was filtered and dried in vacuo to give a black residue. The crude product was purified by silica gel flash chromatography (0-40% EtOAc/Hexanes) to afford compound S6b as an orange solid (82.6 mg, 16% yield); 1H NMR (400 MHz, DMSO-d6) δ 13.7 (br. s, 1H), 8.51 (s, 1H), 8.26 (s, 1H), 8.22-8.14 (m, 2H), 7.80 (d, J=8.4 Hz, 1H), 7.65 (s, 2H); MS (ESI) m/z 274.0 $[C_{13}H_8ClN_3O_2+H]^+$.

2-(4-Chlorophenyl)-1H-benzo[d]imidazol-5-amine S7a

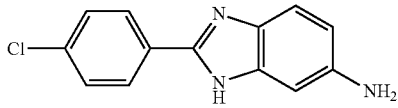

A mixture of S6a (132 mg, 0.482 mmol), iron powder (269 mg, 4.82 mmol, 10 eq.) and NH4Cl (258 mg, 4.82 mmol, 10 eq.) in 4:1 EtOH/water (5 mL) was heated at 80° C. for 5 hours. The mixture was filtered through a pad of celite, washing with MeOH. The filtrate was concentrated and the residue was taken up in water (10 mL) and extracted with EtOAc (3×5 mL). The combined organics were washed with brine, dried over Na2SO4, filtered and concentrated in vacuo give S7a as a brown oil (87.6 mg, 75% yield) which was used in the next step without further purification. 1H NMR (400 MHz, CDCl3) δ 7.91 (d, J=8.4 Hz, 2H), 7.48-7.42 (m, 3H), 6.84 (s, 1H), 6.69 (dd, J=8.4, 2.0 Hz, 1H); MS (ESI) m/z 244.0 $[C_{13}H_{10}ClN_3+H]^+$.

2-(3-Chlorophenyl)-1H-benzo[d]imidazol-5-amine S7b

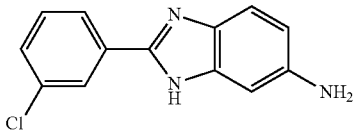 [SMILES: Nc1ccc2nc(-c3cccc(Cl)c3)[nH]c2c1]

A mixture of S6b (82.6 mg, 0.302 mmol), iron powder (169 mg, 3.02 mmol, 10 eq.) and NH4Cl (161 mg, 3.02 mmol, 10 eq.) in 4:1 EtOH/water (5 mL) was heated at 80° C. for 3 hours. The mixture was filtered through a pad of celite, washing with MeOH. The filtrate was concentrated and the residue was taken up in water (10 mL) and extracted with EtOAc (3×5 mL). The combined organics were washed with brine, dried over Na2SO4, filtered and concentrated in vacuo give S7b as a brown oil (72.4 mg, 98% yield) which was used in the next step without further purification. 1H NMR (400 MHz, CDCl3) δ 7.99 (s, 1H), 7.88-7.85 (m, 1H), 7.47 (d, J=8.4 Hz, 1H), 7.36 (d, J=3.2 Hz, 2H), 6.82 (br. s, 1H), 6.68 (dd, J=8.4, 2.0 Hz, 1H); MS (ESI) m/z 244.0 $[C_{13}H_{10}ClN_3+H]^+$.

$N^2$-(2-(4-Chlorophenyl)-1H-benzo[d]imidazol-5-yl)-$N^4$-ethyl-6-methylpyrimidine-2,4-diamine (Formula (II))

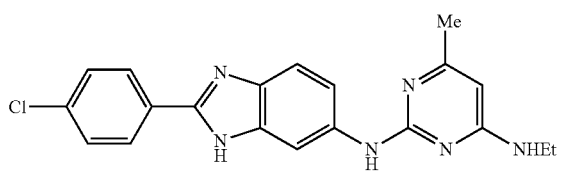

A solution of 2-chloro-N-ethyl-6-methylpyrimidin-4-amine S2 (35.0 mg, 0.204 mmol) and aniline S7a (74.5 mg, 0.306 mmol, 1.5 eq.) in n-BuOH (1 mL) was heated in a microwave reactor at 180° C. for 2 hours. The reaction mixture was azeotroped with toluene to give a white residue which was purified by preparative HPLC (20-50% MeCN/H2O; 0.1% formic acid) to afford compound of formula (II) (formate salt) as an off-white solid upon lyophilization (12.0 mg, 15.5% yield); 1H NMR (400 MHz, DMSO-d6) δ 12.6 (br. s, 1H), 9.00 (s, 1H), 8.28 (s, 1H), 8.14 (d, J=8.8 Hz, 2H), 7.59 (d, J=8.8 Hz, 2H), 7.45 (q, J=8.4 Hz, 2H), 6.98 (br. s, 1H), 5.78 (s, 1H), 3.37 (br. s, 2H), 2.14 (s, 3H), 1.18 (t, J=7.2 Hz, 3H); 13C NMR (100 MHz, DMSO-d6) δ 163.2, 163.0, 159.6, 133.8, 129.3, 129.1, 128.9, 127.8, 127.7, 34.9, 23.3, 14.7; MS (ESI) m/z 379.1 $[C_{20}H_{19}ClN_6+H]^+$; HRMS (ESI) m/z calc'd for $[C_{20}H_{19}ClN_6+H]^+$ 379.1433, found 379.1428; Melting point=142-143° C.

17

$N^2$-(2-(3-Chlorophenyl)-1H-benzo[d]imidazol-5-yl)-$N^4$-ethyl-6-methylpyrimidine-2,4-diamine (Formula (III))

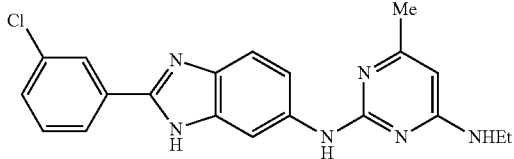

A solution of 2-chloro-N-ethyl-6-methylpyrimidin-4-amine S2 (34.0 mg, 0.198 mmol) and aniline S7b (72.4 mg, 0.297 mmol, 1.5 eq.) in n-BuOH (1 mL) was heated in a microwave reactor at 180° C. for 2 hours. The reaction mixture was azeotroped with toluene to give a white residue which was purified by preparative HPLC (20-60% MeCN/$H_2O$; 0.1% formic acid) to afford compound of formula (III) (formate salt) as a white solid upon lyophilization (38.4 mg, 51.2% yield); 1H NMR (400 MHz, DMSO-d6) δ 12.7 (br. s, 1H), 9.14 (s, 1H), 8.30 (s, 1H), 8.18 (s, 1H), 8.10 (d, J=7.6 Hz, 1H), 7.57-7.44 (m, 4H), 7.04 (br. s, 1H), 5.79 (s, 1H), 3.37 (br. s, 2H), 2.15 (s, 3H), 1.18 (t, J=7.2 Hz, 3H); 13C NMR (100 MHz, DMSO-d6) δ 163.5, 163.0, 159.3, 148.7, 137.2, 133.7, 132.5, 130.8, 128.9, 125.7, 125.6, 124.6, 115.5, 35.0, 23.1, 14.7; MS (ESI) m/z 379.1 [$C_{20}H_{19}ClN_6$+H]$^+$; HRMS (ESI) m/z calc'd for [$C_{29}H_{19}ClN_6$+H]$^+$ 379.1433, found 379.1426; Melting point=142-143° C.

18

M-Ethyl-6-methyl-$N^2$-(2-phenyl-1H-benzo[d]imidazol-5-yl)pyrimidine-2,4-diamine (Formula (IV))

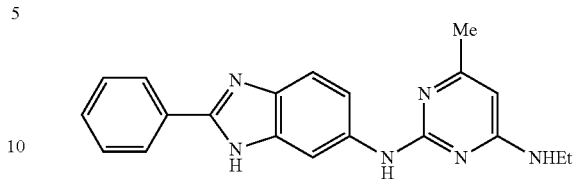

A solution of 2-chloro-N-ethyl-6-methylpyrimidin-4-amine S2 (30.0 mg, 0.175 mmol) and commercially available aniline S7c (54.8 mg, 0.262 mmol, 1.5 eq.) in n-BuOH (1 mL) was heated in a microwave reactor at 180° C. for 2 hours. The reaction mixture was azeotroped with toluene to give a white residue which was purified by preparative HPLC (5-60% MeCN/$H_2O$; 0.1% formic acid) to afford compound of formula (IV) (formate salt) as a white solid upon lyophilization (46.2 mg, 76.7% yield); 1H NMR (400 MHz, DMSO-d6) δ 12.6 (br. s, 1H), 9.28 (s, 1H), 8.25 (s, 1H), 8.13 (d, J=7.2 Hz, 2H), 7.52 (t, J=7.2 Hz, 2H), 7.48-7.43 (m, 3H), 7.13 (br. s, 1H), 5.79 (s, 1H), 3.37 (br. s, 2H), 2.15 (s, 3H), 1.18 (t, J=7.2 Hz, 3H); 13C NMR (100 MHz, DMSO-d6) δ 163.5, 163.0, 159.0, 150.4, 136.6, 130.4, 129.3, 128.8, 126.1, 115.3, 35.0, 22.8, 14.6; MS (ESI) m/z 345.2 [$C_{20}H_{20}N_6$ +H]$^+$; HRMS (ESI) m/z calc'd for [$C_{20}H_{20}N_6$+H]$^+$ 345.1822, found 345.1818; Melting point=149-150° C.

General Procedure for the Synthesis of the racemate of the compound of Formula (V)

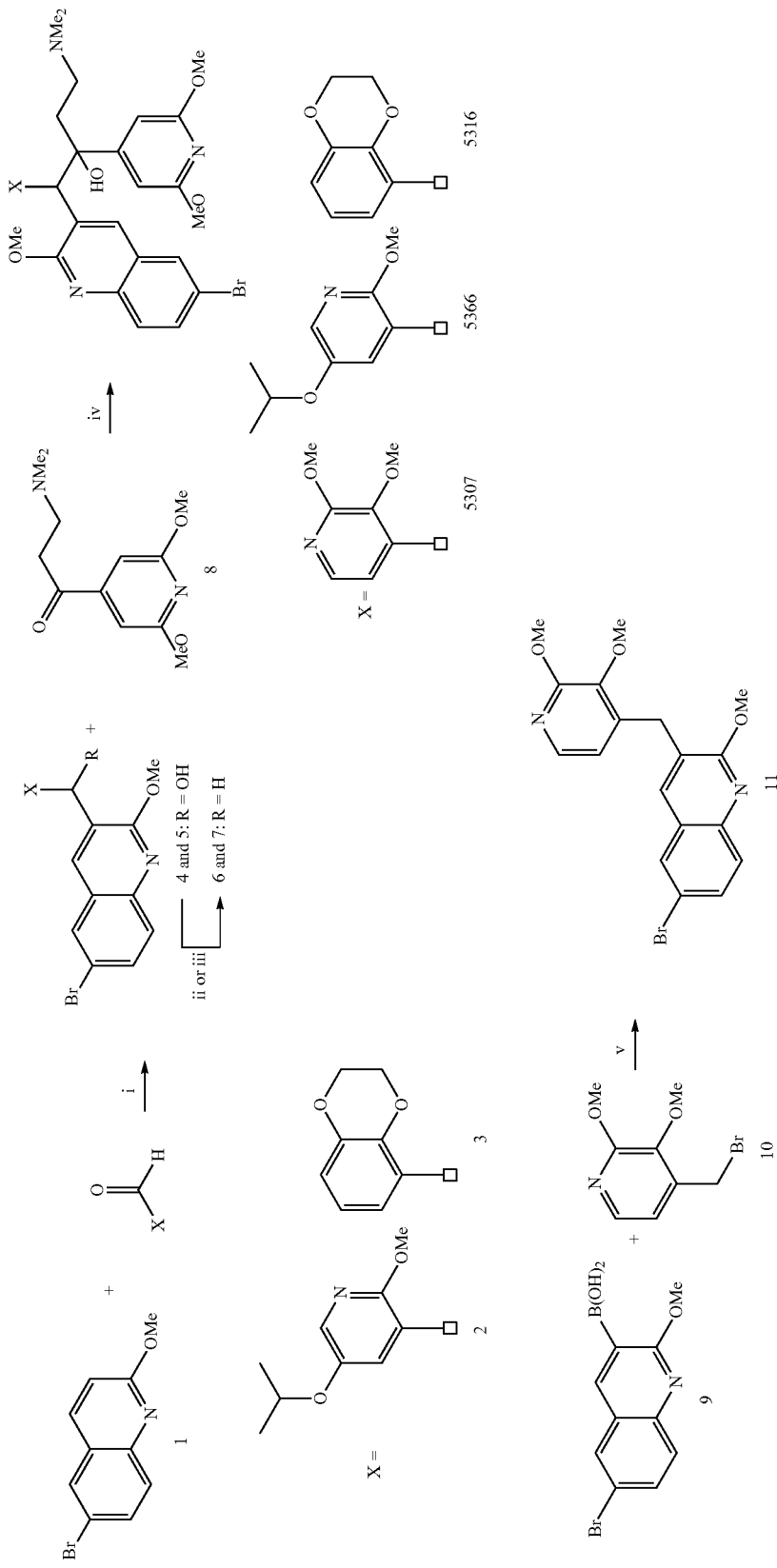
Reagents and conditions:
(i) LiTMP, THF, −78° C., 1.5 h then the appropriate aldehyde, −78° C., 4 h, (4, 37%), (5, 55%); (ii) InCl₃, Ph₂SiHCl, DCE, 80° C., 12 h 44%; (iii) Et₃SiH, TFA, CH₂Cl₂, 50° C., 60%; (iv) Lithium diisopropylamide (LDA), THF, −78° C., 1.5 h then 8, then HOAc, (5307 (formed from reaction of 11 with 8), 9%), (5316, 32%), (5366, 32%); (v) Pd(PPh₃)₄, Cs₂CO₃, PhMe/DMF, 110° C., 5 h, 55%

The synthesis of the racemate of the compound of Formula (V) was performed as follows:

Lithium tetramethylpiperidide (LiTMP) mediated addition of methoxyquinoline (1) and 5-isopropoxy-2-methoxynicotinaldehyde (2) and 2,3-dihydrobenzo[b][1,4]dioxine-5-carbaldehyde (3) afforded the intermediate benzylic alcohols (4) and (5), respectively. Subsequently deoxygenation under acidic conditions to the corresponding dihydro adducts (6) and (7) were performed using InCl₃, Ph₂SiHCl, DCE and Et₃SiH/TFA, respectively. Unfortunately, 6-bromo-3-((2,3-dimethoxypyridin-4-yl)methyl)-2-methoxyquinoline (11) was not formed using either deoxygenation conditions due to the basicity of the pyridine moiety suppressing the reaction. Alternatively, a longer synthetic pathway was employed using Suzuki reaction between the methoxyquinoline boronic acid (9) and 4-(bromomethyl)-2,3-dimethoxypyridine (10) to provide 6-bromo-3-((2,3-dimethoxypyridin-4-yl)methyl)-2-methoxyquinoline (11).

The racemate of the compound of Formula (V) was then synthesized by LDA-mediated addition of the appropriate benzylquinoline (11) and 1-(2,6-dimethoxypyridin-4-yl)-3-(dimethylamino)propan-1-one (8), which were reported by Sutherland et al. (Sutherland H S, Tong A S T, Choi P J, Conole D, Blaser A, Franzblau S G, Cooper C B, Upton A M, Lotlikar M U, Denny W A, Palmer B D. 2018. Structure-activity relationships for analogs of the tuberculosis drug bedaquiline with the naphthalene unit replaced by bicyclic heterocycles. Bioorg Med Chem 10 26:1797-1809.) The resulting diarylquinoline was formed as a racemic mixture of two diastereomers, which were separated by column chromatography. The structure of the desired diastereomers were further determined by X-ray crystallography and characterized in ATP synthesis and cell growth assays.

General Procedure for the Synthesis of the compound of Formula (VI)

The compound of Formula (VI) is synthesized as shown in the following scheme:

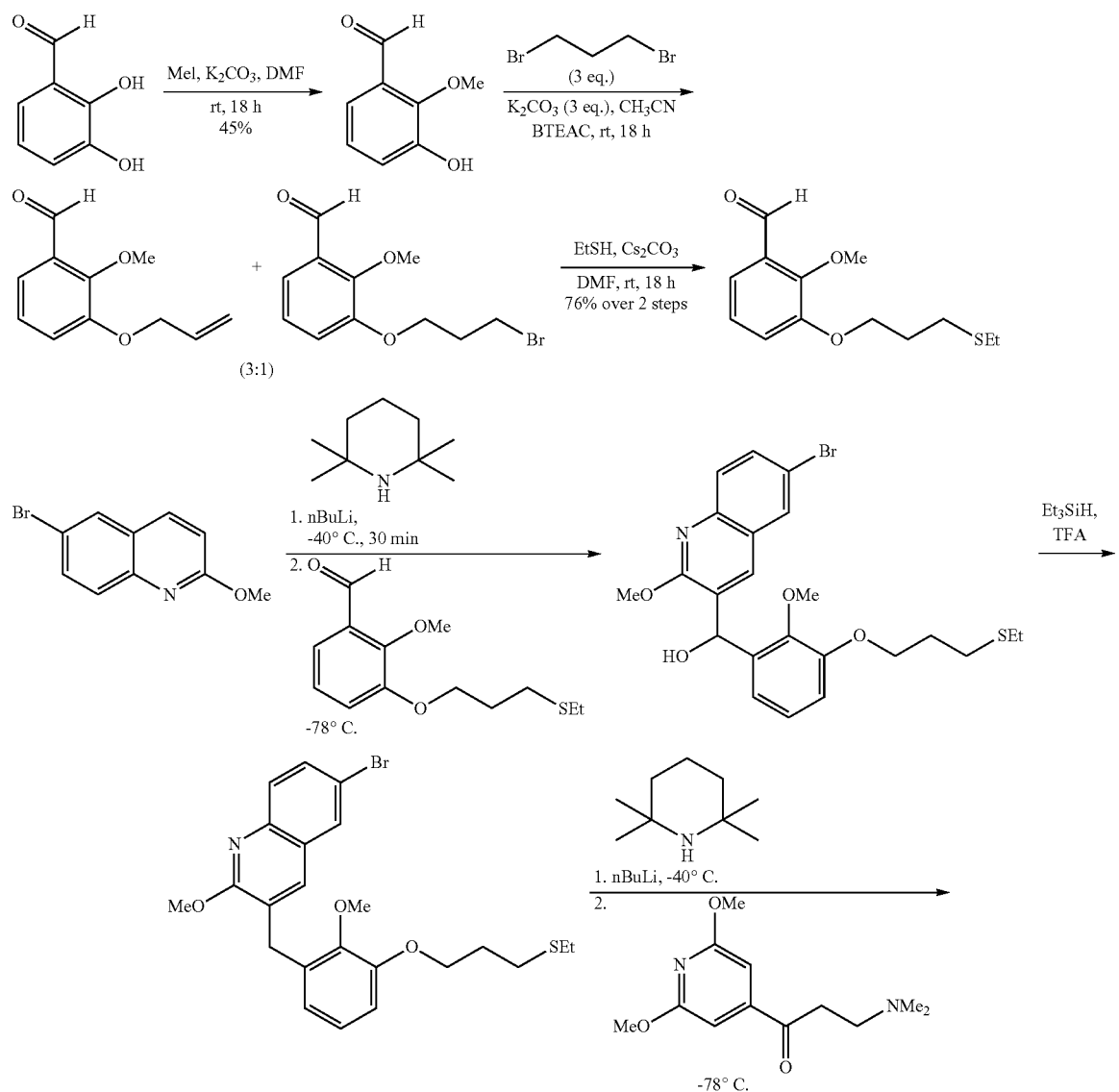

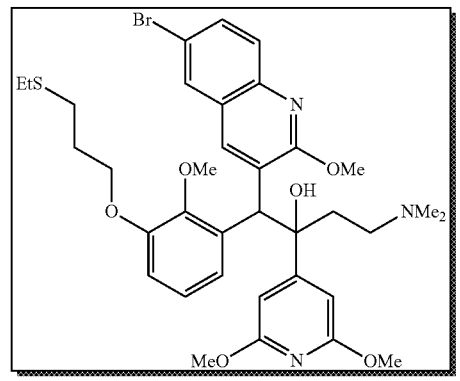

It should be further appreciated by the person skilled in the art that variations and combinations of features described above, not being alternatives or substitutes, may be combined to form yet further embodiments falling within the intended scope of the invention.

The invention claimed is:

1. A compound of formula (Ia) or (Ib)

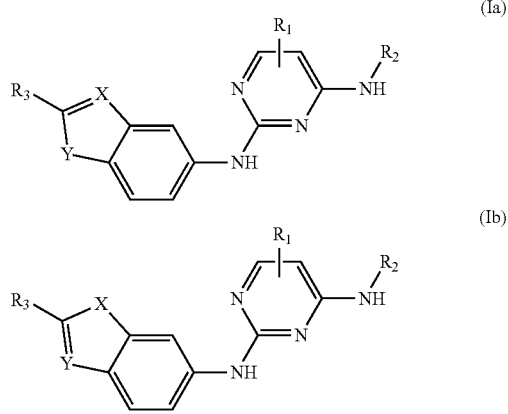

wherein

R₁ is hydrogen or a methyl group;

R₂ is an unsubstituted or substituted alkyl group;

R₃ is an aryl group or a heteroaryl group, optionally substituted by one or more groups selected from halogen, alkyl or alkoxy; and, in Formula (Ia), X is CH or N and Y is NH, S or O, or, in Formula (Ib), X is NH, S or O and Y is CH or N.

2. The compound according to claim 1, wherein, in Formula (Ia), X is N and Y is NH, or, in Formula (Ib), X is NH and Y is N.

3. The compound according to claim 1, wherein R₁ is a methyl group at the 6-position of the pyrimidine ring.

4. The compound according to claim 1, wherein R₂ is an ethyl group or a —CH₂COOCH₂CH₃ group.

5. The compound according to claim 1, wherein R₃ is an aryl group.

6. The compound according to claim 5, wherein the aryl group is substituted by one or more halogen atoms.

7. The compound according to claim 1, wherein the compound is selected from the group consisting of

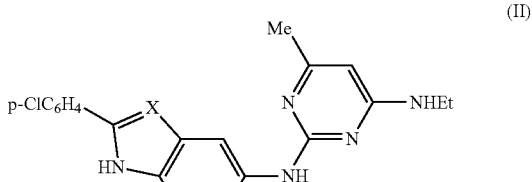

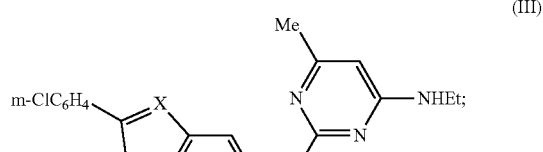

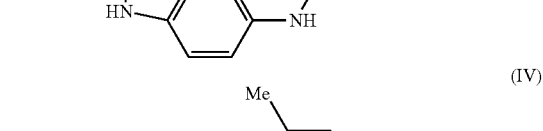

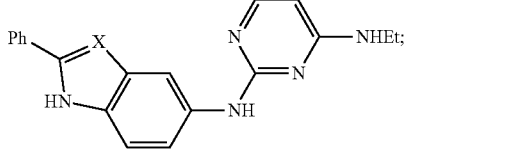

and tautomers thereof.

8. A composition comprising the compound according to claim 1 or a pharmaceutically acceptable salt thereof and bedaquiline (BDQ), an analogue of bedaquiline (BDQ) or a mixture thereof.

9. The composition according to claim 8, wherein the analogue of bedaquiline (BDQ) comprises a racemate of a compound of formula (V):

(V)

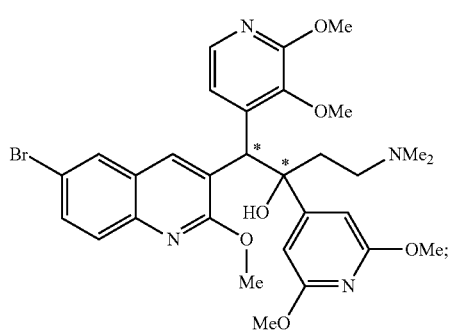

or
a racemate of a compound of formula (VI):

(VI)

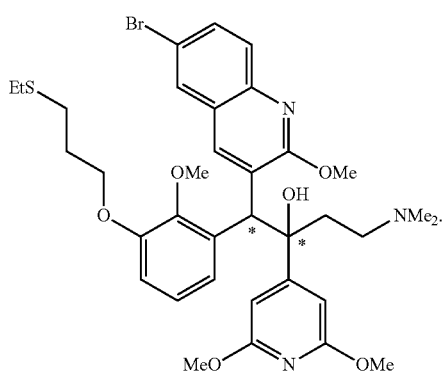

10. A method of treating a subject suffering from a bacterial infection comprising the steps of administering to the subject a therapeutically effective amount of a compound of formula (Ia) or (Ib)

(Ia)

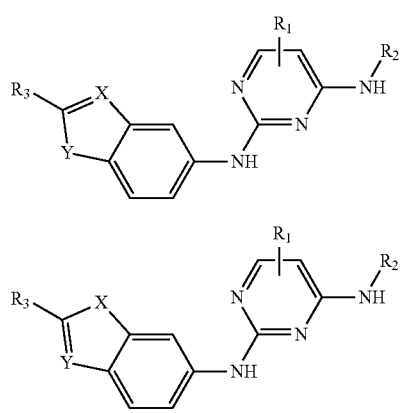

(Ib)

wherein
$R_1$ is hydrogen or a methyl group;
$R_2$ is an unsubstituted or substituted alkyl group;
$R_3$ is an aryl group or a heteroaryl group, optionally substituted by one or more groups selected from halogen, alkyl or alkoxy; and,
in Formula (Ia), X is CH or N and Y is NH, S or O, or, in Formula (Ib), X is NH, S or O and Y is CH or N.

11. The method according to claim 10, wherein, in Formula (Ia), X is N and Y is NH, or, in Formula (Ib), X is NH and Y is N.

12. The method according to claim 10, wherein $R_1$ is a methyl group at the 6-position of the pyrimidine ring.

13. The method according to claim 10, wherein $R_2$ is an ethyl group or a —$CH_2COOCH_2CH_3$ group.

14. The method according to claim 10, wherein $R_3$ is an aryl group.

15. The method according to claim 10, wherein the aryl group is substituted by one or more halogen atoms.

16. The method according to claim 10, wherein the compound is selected from the group consisting of (II)

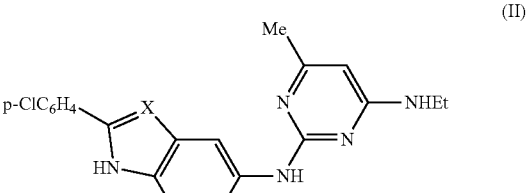

(III)

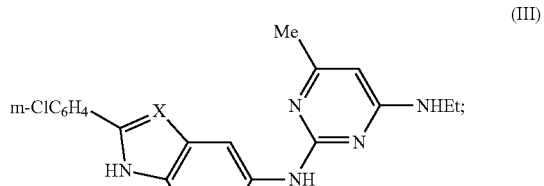

(IV)

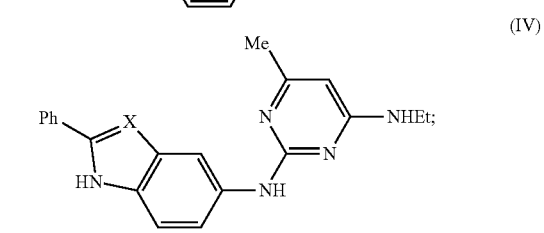

and tautomers thereof.

17. The method according to claim 10, wherein the bacterial infection is tuberculosis.

18. The method according to claim 17, wherein the tuberculosis is multi-drug-resistant or extensively drug-resistant tuberculosis.

19. A method of synthesizing the compound according to claim 1, wherein: X is N, Y is NH, $R^1$ is methyl, $R^2$ is ethyl, and $R^3$ is Ar, wherein Ar is selected from the group consisting of p-$ClC_6H_4$, m-$ClC_6H_4$, and phenyl; the method comprising the following steps:
(a) reacting 4-nitrobenzene-1,2-diamine with Ar—COCl in the presence of an acid to obtain Ar-substituted nitro-benzimidazole

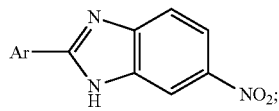

(b) reducing the nitro group of the Ar-substituted nitro-benzimidazole of step (a) to obtain the respective amine derivative

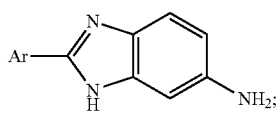
and
(c) reacting the amine derivative of step (b) with 2-chloro-N-ethyl-6-methylpyrimidin-4-amine to obtain a compound selected from the group consisting of
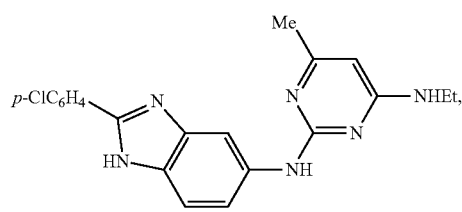
(II)
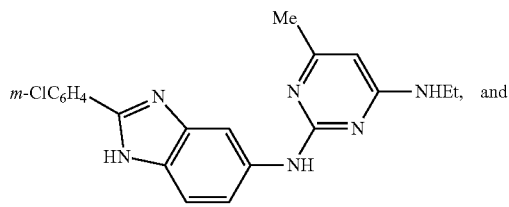
(III)
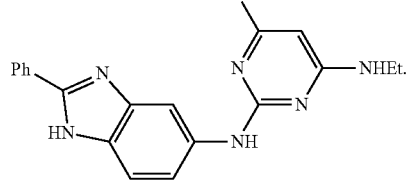
(IV)